(12) United States Patent
Kuwabara

(10) Patent No.: US 7,341,378 B2
(45) Date of Patent: Mar. 11, 2008

(54) LINEAR MOTION GUIDE UNIT

(75) Inventor: Hideki Kuwabara, Mino (JP)

(73) Assignee: Nippon Thompson Co., Ltd., Tokyo (JP)

( * ) Notice: Subject to any disclaimer, the term of this patent is extended or adjusted under 35 U.S.C. 154(b) by 203 days.

(21) Appl. No.: 11/251,937

(22) Filed: Oct. 18, 2005

(65) Prior Publication Data

US 2006/0104552 A1    May 18, 2006

(30) Foreign Application Priority Data

Nov. 17, 2004   (JP) .............................. 2004-332643

(51) Int. Cl.
*F16C 29/06* (2006.01)
(52) U.S. Cl. .......................................... 384/44; 384/13
(58) Field of Classification Search ............... 384/13, 384/43–45
See application file for complete search history.

(56) References Cited

U.S. PATENT DOCUMENTS 4,799,805 A * 1/1989 Tanaka ......................... 384/44
4,988,215 A * 1/1991 Osawa ......................... 384/44
5,308,164 A * 5/1994 Tanaka ......................... 384/13

FOREIGN PATENT DOCUMENTS

| JP | 05-209617 |   | 8/1993 |
| JP | 09-072335 |   | 3/1997 |
| JP | 10-78032  | * | 3/1998 |
| JP | 2001-082469 |   | 3/2001 |

* cited by examiner

*Primary Examiner*—Thomas R. Hannon
(74) *Attorney, Agent, or Firm*—Browdy and Neimark, PLLC

(57) ABSTRACT

A linear motion guide unit suitable for slender rollers, in which a tubular composition to define a return passage as well as a spacer piece to make a turnaround improve in property of retaining lubricant therein, thereby helping accomplish long-lasting service operation for lubrication. The tubular composition is composed of a tubular skeleton and a cellular member that fits into a window cut in the tubular skeleton. An end cap is comprised of an end cap major body, and two classes of spacer pieces nested in the end cap major body to define the turnaround passages. The spacer pieces of two classes are each made around outside surfaces thereof with some circular holes, which have functions of lubricant reservoirs, prevention of distortion or deformation caused in the molded spacer pieces, and ejector pinholes used to extract the molded spacer pieces out of the mold.

8 Claims, 7 Drawing Sheets

LINEAR MOTION GUIDE UNIT

FIELD OF THE INVENTION

The present invention relates to a linear motion guide unit comprised of an elongated guide rail, and a slider that is allowed to move on the elongated guide rail relatively to the guide rail by virtue of more than one rolling element.

BACKGROUND OF THE INVENTION

The recently remarkable development in mechatronics technology extensively requires various sorts of linear motion guide units, especially, linear motion guide units of the type using rolling elements of cylindrical roller, which are also required to meet with the maintenance-free operation where there is no need of lubricant replenishment for considerably long service life even under severe operating conditions. Most conventional linear motion guide units are composed of an elongated guide rail and a slider that moves relatively to the guide way by virtue of more than one rolling element, which is allowed to roll through a recirculating circuit that is made up of a load-carrying race defined between the guide rail and the slider, and a non-loaded area including a return passage and forward and aft turnaround passages made in the slider. With the linear motion guide units built in a diversity of machines, continuous application of lubricant on or between the load-carrying race and the rolling element is inevitable to continue maintaining an adequate lubricant film between the load-carrying race and the rolling element to keep them against metal-to-metal contact that might otherwise occur, thereby making sure of their high durability. To deal with the lubrication issue, most prior linear motion guide units have been ordinarily lubricated with periodic replenishment of lubricant so as to make certain of forming the lubricant film separating the rolling element from the circulating race. Recently advanced machines and instruments, nevertheless, are increasingly needed to make them virtually maintenance-free from many aspects of conserving energy as well as keeping running cost and maintenance cost of equipment reasonable. Correspondingly, the linear motion guide units built in the advanced machinery are also challenged to keep the consumption of lubricant to a minimum, along with keeping linear motion guide units virtually maintenance free.

In the commonly assigned Japanese Patent Laid-Open No. 2001-82469, there is disclosed a linear motion guide unit in which a return passage in a carriage of the slider is made of sintered resinous member of cellular or porous structure that is impregnated with lubricant to be applied on the rolling elements. The prior linear motion guide unit constructed as stated just earlier is comprised of an elongated guide rail, a slider movable lengthwise relative to the guide rail, and more than one rolling element allowed rolling into the load-carrying race defined between the guide rail and the slider from the non-loaded return passage cut in the slider, and vice versa in a recirculating manner. The return passage is constituted with a sleeve of sintered resinous member having cellular structure, which fits into a fore-and-aft hole made in the carriage of the slider. Oily lubricant or grease once soaked in the sintered resinous member preparatory to fit into the carriage is reserved or held in the cells or pores in the cellular structure. Oily ingredient of the lubricant is constantly applied on the rolling elements while they roll through inside the sleeve, and oil films around any rolling elements get lubricating smoothly the load-carrying surfaces or raceway grooves as the rolling elements run through load race, with accompanying reduced maintenance.

Another commonly assigned Japanese Patent Laid-Open No. H09-72335 discloses a linear motion guide unit in which a sleeve for a return passage fits into a fore-and-aft hole made in a carriage of the slider to provide the return passage. The sleeve is made easier to experience elastic deformation to absorb the frictional resistance occurring on the rolling elements, thereby ensuring smooth running of the rolling elements. With the linear motion guide unit constructed as recited just earlier, the rolling elements are made in the form of cylindrical roller while the return passage is defined inside the sleeve that fits closely into the return hole cut in the carriage. The sleeve is made it possible to get elastic deformation, ensuring smooth traveling of the slider. In the linear motion guide unit recited above, especially, an ample clearance is left between the circular surface inside the fore-and-aft hole for the return passage and the outside surface around the middle area of the sleeve to allow the sleeve to get elastically deformed therein and also reserve lubricant therein.

A further another sort of linear motion guide means is disclosed in the commonly assigned Japanese Patent Laid-Open No. H05-209617, in which a spacer piece is installed in an end cap to provide a turnaround passage inside the end cap. The spacer piece installed in the end cap to have the turnaround passages therein is made on the curved surface thereof with a turnaround race where two lines of lubricant reservoir grooves are cut to get lubricant escaping through there. With the linear motion guide unit recited above, the end cap is made concave to provide a recess in preparation for the turnaround passage while the spacer piece having the turnaround race around there fits into the recess to define the turnaround passage between them. The spacer piece is made on the turnaround race thereof with lubricant reservoir grooves, which extend in the running direction of the rolling elements to retain the lubricant therein while getting the lubricant to escape from there.

With the linear motion guide unit in which cylindrical rollers are selected as the rolling elements, nevertheless, alignment problems to guide rollers in good rolling order without leaning in rolling posture are more encountered, compared with the construction using balls. Besides, the cylindrical rollers have to be guided not only on their circular rolling surfaces, but also on their axially opposite end surfaces. Conventionally, there is no linear motion guide unit constructed to meet with an aspect of allowing the rollers to roll through the recirculating circuit over a long-lasting service life with adequate application of lubricant, making certain of steady reliability of the maintenance-free on lubricant application.

With the linear motion guide units in which the cylindrical rollers are selected for the rolling elements, moreover, as there is some tendency to displace much lubricant from the load-carrying race compared with balls, it is needed for the aspect of ensuring maintenance-free operation to sustain more lubricant in the recirculating circuit for the rollers than for the balls. In addition, the cylindrical rollers should be guided in good order without leaning in rolling posture, that is to say, the cylindrical rollers have to be guided not only on their circular surfaces, but also on their axially opposite end surfaces.

The prior linear motion guide unit disclosed in the Japanese Patent Laid-Open No. H05-209617 recited earlier is favorable for the cylindrical roller larger in diameter, but unsuited for the slender roller, which is easier to lean to get more failure in recirculating performance. Thus, the prior linear motion guide unit would involve the alignment problem where the cylindrical rollers are prone to lean to get more failure in recirculating performance that would ensure the steady recirculation to the rollers for long-lasting service period with maintenance-free condition for lubricant replenishment.

With the prior linear motion guide units disclosed in the Japanese Patent Laid-Open No. 2001-82469 recited earlier, the return passage made in the carriage of the slider is defined by just sintered resinous member of cellular geometry, which is lack of mechanical stiffness enough to guide steadily the cylindrical rollers. The rollers, as opposed to the balls, need functioning on line-rolling contact around their circular surfaces without getting tilted in rolling posture. In other words, the rollers have to be not only born against their circular surfaces, but also guided in sliding manner on their axially opposite ends to get the slider moved steadily with smoothness, ensuring the long-lasting service life with stability. Thus, the prior linear motion guide units of the sort in which the return passage is made of only sintered resinous member of cellular geometry, because there is a scarcity of mechanical stiffness in the sintered resinous member, have been unsuited for making certain of smooth recirculation of the rollers.

There, advanced technology has come to hope any linear motion guide unit in which the sleeve to define the return passage in the carriage of the slider is much raised in mechanical stiffness, even with simple in construction and easier to fit it into the slider as well as making sure of positive lubricant application to the rolling elements to render the maintenance-free operation steadier.

SUMMARY OF THE INVENTION

The present invention has for its primary object to overcome the shortcomings as stated earlier, and to provide a linear motion guide unit constructed to render it suitable for slender rollers, in which even rollers small in diameter are tough to lean while there is no possibility a spacer piece to provide a turnaround passage affects negatively the recirculating performance of the rollers, thereby ensuring that the rollers are guided smoothly over a long-lasting service life with steady maintenance-free condition for lubricant replenishment. More particularly, the present invention provides a linear motion guide unit in which the spacer piece to define the turnaround passage has a lubricant reservoir to ensure copious lubrication onto the rollers, and a sleeve to define a return passage in a slider is upgraded in mechanical strength, the sleeve being made of a tubular composition comprised of a tubular skeleton partially cutaway to have windows therein, and a cellular molded member, the cellular molded member being impregnated in advance with lubricant to fill cells or pores with the lubricant, and followed by fit into the windows to make the tubular composition into a composite construction, thereby establishing maintenance-free operation to ensure proper lubrication on a recirculating circuit for the rollers.

The present invention is concerned with a linear motion guide unit comprising an elongated guide rail having a lengthwise raceway surface thereon, and a slider movable lengthwise of the elongated guide rail, the slider being comprised of a carriage made therein with a second raceway surface in opposition to the first raceway surface and a return passage extending in parallel with a load race defined between the first and second raceway surfaces, end caps mounted on lengthwise opposite ends of the carriage and made therein with turnaround passages connecting the load race with the associated return passage, and more than one roller allowed to roll through a recirculating circuit composed of the load race, the return passage and the turnaround passages, wherein the end caps are each comprised of an end cap major body to make a radially outside curved surface of the turnaround passage and guide surfaces extending along widthwise opposite edges of the radially outside curved surface to make a sliding-contact with axially opposite ends of the roller, and a spacer having an outside surface to make a radially inside curved surface of the turnaround passage after having fitted into the end cap major body, the outside surface of the spacer having thereon some holes, which have functions of lubricant reservoirs, prevention of distortion caused in the molded spacer pieces, and ejector pinholes.

In an aspect of the present invention, there is disclosed a linear motion guide unit in which the holes in the spacer are made circular in shape and identical in their heading directions to be opposite against rolling surfaces of the rollers while they roll through the turnaround passage.

In another aspect of the present invention, there is disclosed a linear motion guide unit in which the holes made around the outside surface of the spacer are six in all in a fashion that three spaced at a regular intervals in a row are made double.

In another aspect of the present invention, there is disclosed a linear motion guide unit in which a raised portion of reference is made on a mating side of the spacer to determine whether the spacer is oriented in a right direction when the spacer is assembled in the end cap major body.

In another aspect of the present invention, there is disclosed a linear motion guide unit in which the return passage is provided by a hole rectangular in transverse section defined inside a tubular composition that fits into a hole made in the carriage, and the tubular composition is composed of a tubular skeleton having therein a lengthwise window made open from a circular surface thereof to the hole, and a molded member extending lengthwise to fit into the window in the tubular skeleton to provide a return race for the return passage, the molded member being made of a cellular material adapted to be impregnated with lubricant.

In a further another aspect of the present invention, there is disclosed a linear motion guide unit in which the tubular skeleton is made of synthetic resin while the cellular material is made of a sintered resinous material.

In another aspect of the present invention, there is disclosed a linear motion guide unit in which the end caps are each made therein with the turnaround passages arranged in a staggered relation with one another to make a pair of the recirculating circuits in the slider in a fashion that they are arranged in a staggered relation with each other, and wherein the turnaround passages staggered with one another are provided by the spacer accommodated in a recess made in the end cap major body, the space being constituted with a combination of a first spacer piece and a second spacer piece, the first spacer piece being fitted into the recess in the end cap major body to define any one of the turnaround passages, which is made more deeply than another turnaround passage in the end cap, and the second spacer piece being nested in a recess made in the first spacer piece to define the another turnaround passage, which is made less in depth than the one turnaround passage.

In another aspect of the present invention, there is disclosed a linear motion guide unit in which the first spacer piece is provided in the recess therein with a shoulder against which the second spacer piece is born when having received inside the recess.

In a further another aspect of the present invention, there is disclosed a linear motion guide unit in which the first and second spacer pieces are made on their rearward surfaces with second lubricant grooves that communicate with first lubricant paths cut in the end cap major body while reach their associated recirculating circuits.

With the linear motion guide unit constructed as stated earlier, the spacer pieces to define the turnaround passages are provided around their outside surfaces with some holes to reserve lubricant on the races around which the rollers turn in running direction through there, making sure of smooth rolling of the rollers.

With the linear motion guide unit in which the tubular composition to define the return passage is composed of a tubular skeleton having therein windows, and cellular members to fit into the windows in the tubular skeleton, moreover, the tubular composition is enhanced in mechanical strength for itself while the cellular members impregnated with lubricant are high in capability of soaking up and retaining oily lubricant or grease in cells or pores. Thus, the rolling elements, when coming into rolling-contact with the cellular member while rolling through the return passage, are applied with lubricant film, which would be transferred to the circulating circuit as the rolling elements roll thorough the circuit, thereby establishing maintenance-free operation to ensure proper lubrication on a recirculating circuit for the rolling circuit.

The linear motion guide unit constructed according to the present invention, consequently, may serve lubricating function with efficiency in harshest working environment including high temperature, and so on, as well as in clean atmosphere where there are any constraint on the application of lubricant. Further, the linear motion guide unit of the present invention is better for reducing sliding resistance in the load-carrying race in the linear motion guide unit that is high in operating speed and reciprocating cycle, even with no need of maintenance for periodic lubricant replenishment.

DETAILED DESCRIPTION OF THE PREFERRED EMBODIMENTS

Figure 1:
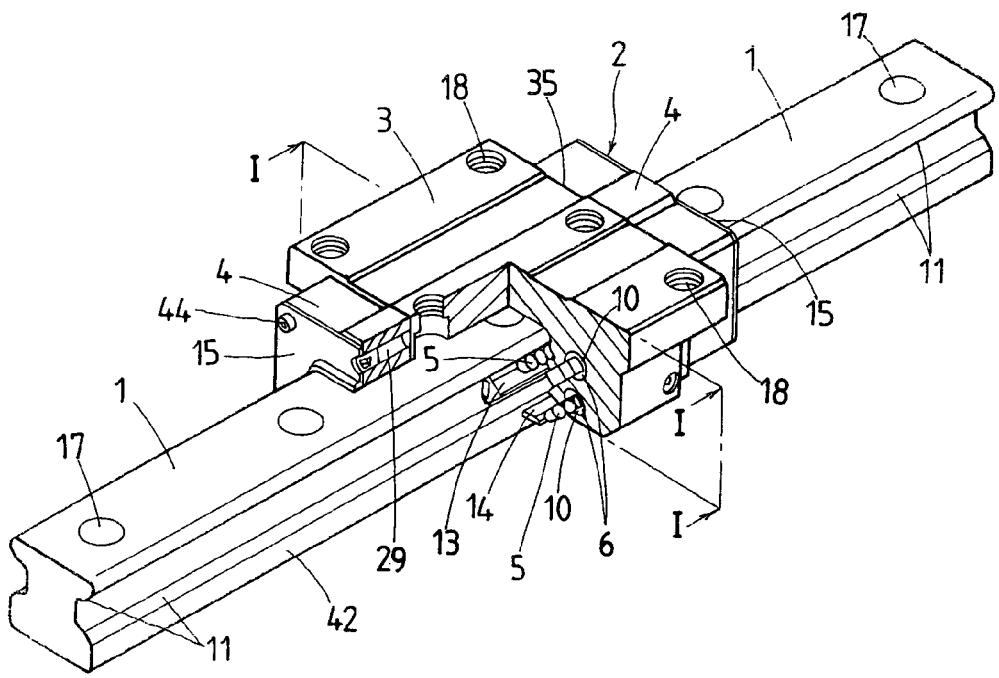
FIG. 1 is a partially cutaway view in perspective illustrating a preferred embodiment of a linear motion guide unit according to the present invention.

The linear motion guide unit according to the present invention is adapted for use in any relatively sliding components in machinery as diverse as precision machines, measurement/inspection instruments, medical instruments, micromachines, machine tools, and so on.

Referring now in detail to the drawings, the linear motion guide unit according to the present invention will be explained below. The linear motion guide unit of the present invention is composed of a roller-bearing type which is finding in recent years increased application. The present invention is envisaged developing especially the linear motion guide unit having rollers whose diameter is comparatively small, which can cope with demand to work over long-lasting operation even with maintenance-free condition for lubricant replenishment.

The linear motion guide unit of the present invention is composed of the roller-bearing type whose rolling element is a roller 5, and envisaged further developing the linear motion guide units disclosed in the prior citations recited earlier into those best to the construction having the rollers whose diameter is thin or slender. The linear motion guide unit of the present invention features improvements in a lubricant supplier system to the rollers 5 and in spacer pieces 45, 46 combined with one another to form a rolling race inside the turnaround passage 30. According to the present invention, more particularly, the spacer pieces 45, 46 are each made therein with some circular holes 47, 48 to achieve the prolonged maintenance-free service life with no lubricant replenishment over the prior art. End caps 4 are each comprised of a major body 50 having a recess 77 therein, and the combined spacer pieces 45, 46 made to fit into the associated recess 77. In the embodiment described here, the first or major spacer piece 45 fits into the end cap major body 50 while the second or minor spacer piece 46 is nested snugly in the major spacer piece 45. With the linear motion guide unit of the present invention, any conventional sleeve to define a return passage 10 is superseded with a tubular composition 6 made of a composite construction of a tubular skeleton 7 with cellular members 8. The tubular composition 6 has a lengthwise central hole 30, which may provide the return passage 10 after the tubular composition 6 has been inserted into a fore-and-aft hole 9 in a carriage 3 of a slider 2. The tubular composition 6 is best to the construction where the rollers or cylinders 5 are selected as rolling elements, and also realizes the maintenance-free condition for lubricant supply to the recirculating circuit.

The linear motion guide unit having a slider 2 allowed to move relatively to a guide rail 1 is characterized in that, first, the rollers 5, even with their diameters being small or slender, are allowed to move without leaning in rolling posture while the combined spacer pieces 45, 46 to define radially inside curved surfaces 56, 58 of the turnaround passages 30 are made with some holes 47, 48 around their outside surfaces thereof, and second, the tubular composition 6 is made up of the tubular skeleton 7 having a window 24 made open to the central hole 36 or the return passage 10 from a circular outside surface, and a cellular member 8 that fits into the associated window 24, the cellular member 8 being able to be impregnated with lubricant to fill cells or pres in the cellular member 8 to reserve ample lubricant on the passage 10, thereby making certain of steady lubrication to the rollers 5 while they roll through the return passage 10. The roller 5 is a cylinder having a rolling surface 39 and axially opposite ends 40.

The linear motion guide unit of the present invention, as shown in FIGS. 1 to 4, is made most favorable for the construction where the rollers or cylinders 5, especially cylinders whose diameter is slender, are selected as rolling elements, and also is comprised of an elongated guide rail 1, a slider 2 allowed to move lengthwise of the guide rail 1, and more than one rolling element 5 of cylindrical roller installed to roll through a recirculating circuit that includes a load-carrying race 34 defined between the guide rail 1 and the slider 2.

Figure 4:
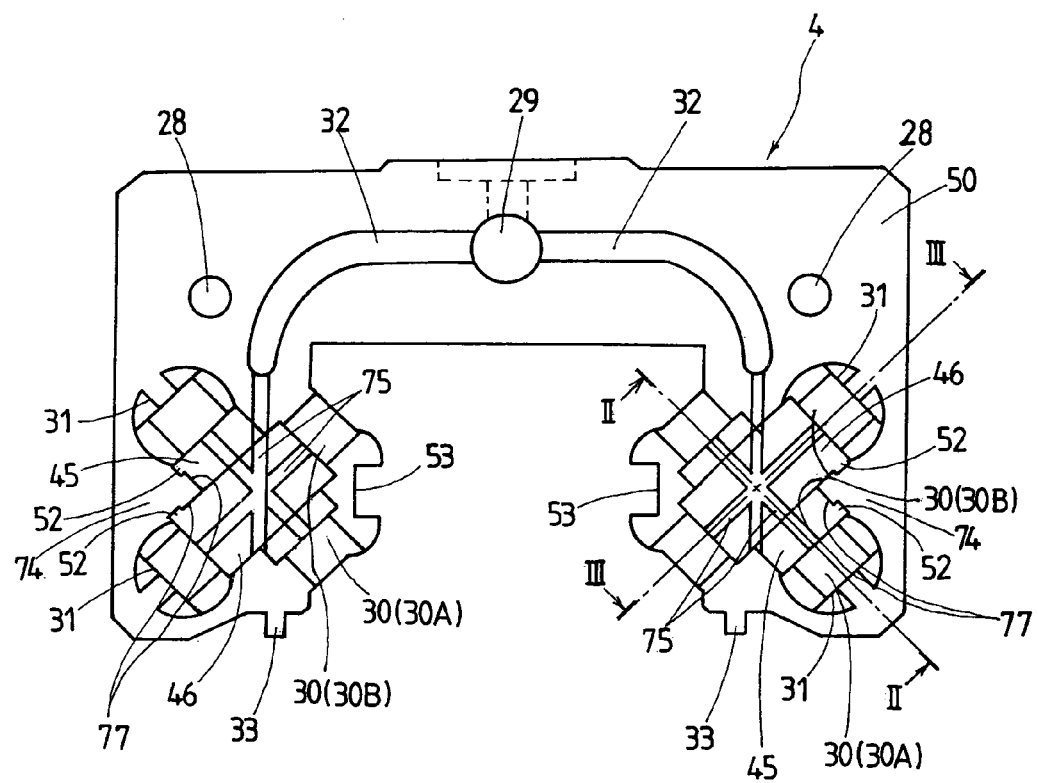
FIG. 4 is a view in rear elevation of an end cap in the linear motion guide unit of FIG. 1.

The slider 2 is composed of the carriage 3 made thereon with raceway surfaces 12 in opposition to raceway surfaces 11 cut in the guide rail 1 to provide the load-carrying races 34 and made therein with the return passages 10 extending in parallel with the load-carrying races 34, end caps 4 arranged on forward and aft ends 35 of the carriage 3, one each end, and formed therein with the turnaround passages 30, refer to FIG. 4, to communicate any one race 34 with the associated return passage 10, end seals 15 attached to outward end surfaces of the end caps 4, and more than one roller 5 allowed to roll through the recirculating circuits each of which is made up of any one load-carrying race 34, the associated return passage 10 and the forward and aft turnaround passages 30 to communicate the load-carrying race 34 with the associated return passage 10. With the slider 2 constructed as stated earlier, the return passages 10 in the carriage are constituted with the central holes 36 inside the tubular compositions 6 that are inserted into the fore-and-aft holes 9 made in sidewise opposite portions 16 of the carriage 3. The end caps 4 and end seals are both secured to the carriage 3 with using fastening bolts 44. More than one cylinder or roller 5 is born on any one of axially opposite ends 40 thereof in line-contact relation against an elongated retainer plate 13 extending along the race 34 across the carriage 3b and the end caps 4. The retainer plate 13 is secured to the forward and aft end caps 4 with binding strip 49 that fits into grooves 53 cut into the end caps 4. With the linear motion guide unit of the present invention, paired recirculating circuits in the slider 2 are made intersected with one another in a staggered relation at the end caps 4 in such a way that the rollers 5 rolling through the upside load-carrying race 34 enter the downside return passage 10 while other rollers 5 running through the downside load-carrying race 34 enter the upside return passage 10 as the slider 2 moves relatively to the guide rail 1.

Figure 3:
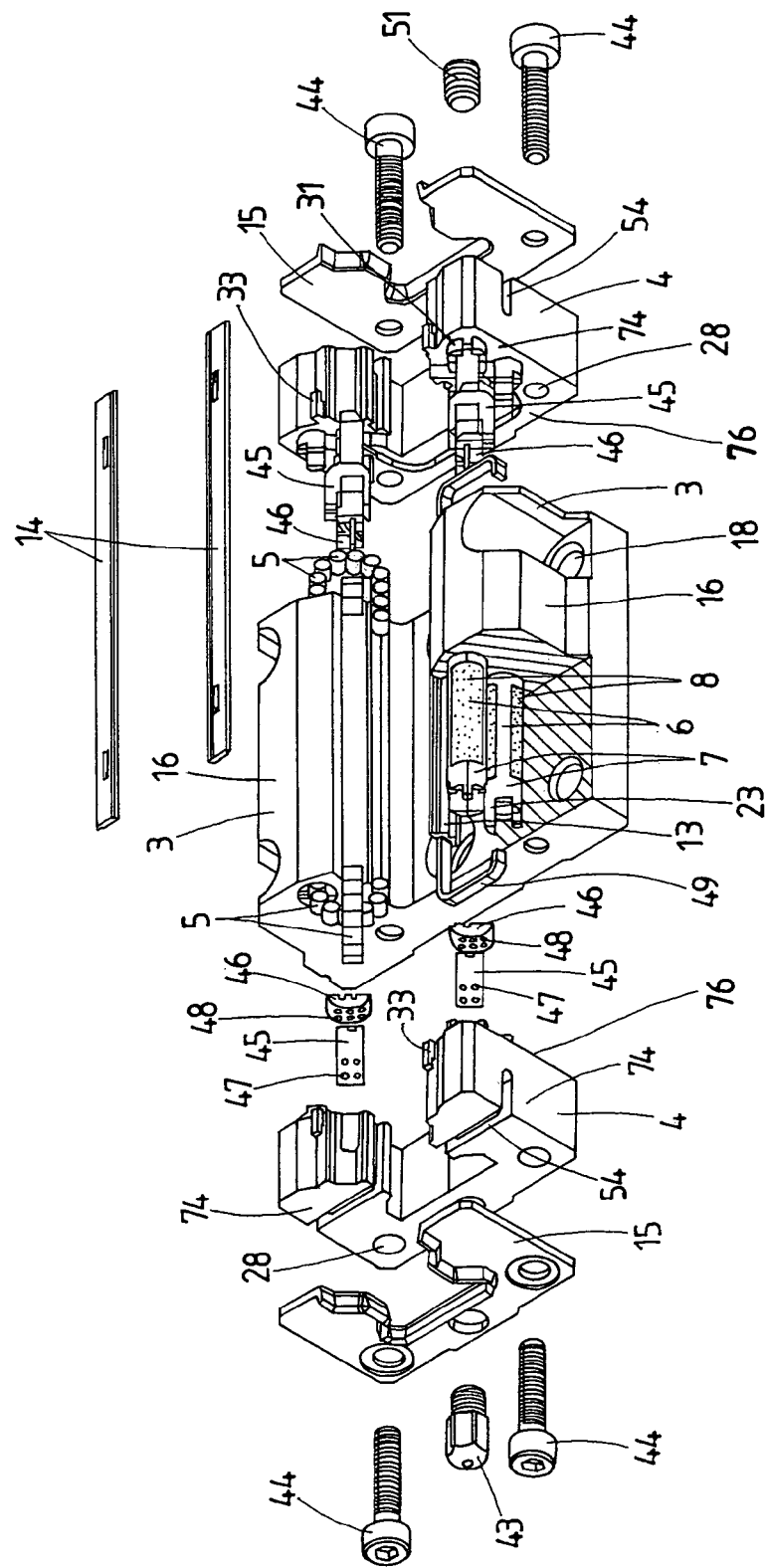
FIG. 3 is an exploded view in perspective, partially broken away, showing a slider in the linear motion guide unit of FIG. 1, as seen looking into the interior thereof from below.

With the linear motion guide unit of the present invention, moreover, a lower seal 14 is disposed to extend over the underneath of the carriage 3 and the forward and aft end caps 4 while end seals 15 are attached to outward end surfaces of the end caps 4, so that the slider 2 is sealed effectively against outside atmosphere. A grease nipple 43, refer to FIG. 3, is coupled to any one of the forward and aft end caps 4 to feed lubricant to the recirculating circuit through a lubrication port 29. Another end cap 4 having no grease nipple is plugged up with a closure 51 at the lubrication port 29. The guide rail 1 is made with some holes that are used to fasten the guide rail 1 to any stationary bed including machine bed, mounting base, workbench, and so on, while the carriage 3 of the slider 2 is made with threaded holes 18 that are used to install any object including various instruments, works, attachments, and so on thereon. On the end caps 4, moreover, there are provided raised portions 33 below the underneath of the end cap 4 to hold in place the lower seal 14, and also bolt holes 28 to allow bolts to fasten the end caps 4 to the carriage 3. The end caps 4 are each made therein with the lubrication port 29 fed with lubricant from any lubricant source including the grease nipple, and so on, and oiling paths 32 to communicate the lubrication port 29 to the turnaround passages 30 in the recirculating circuit.

Figure 5:
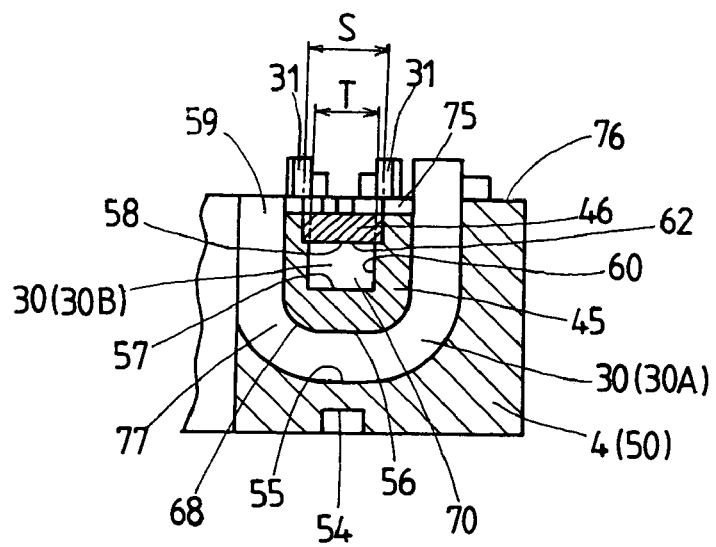
FIG. 5 is a view in transverse section of the end cap and taken on the plane of the line II-II of FIG. 4.
Figure 6:
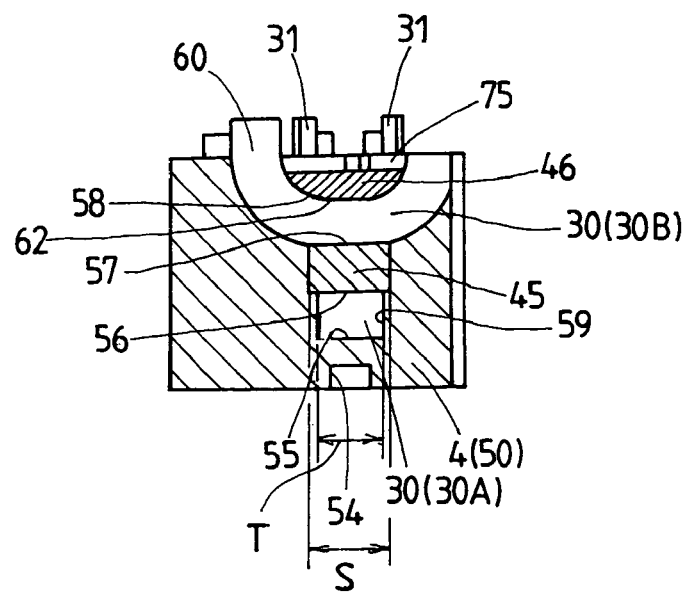
FIG. 6 is a view in transverse section of the end cap and taken on the plane of the line III-III of FIG. 4.

The linear motion guide unit of the present invention, especially, features that the turnaround passages 30 in the end cap 4 are defined with the end cap major body 50 and the combined construction of the major spacer piece 45 with the minor spacer piece 46, the combined construction being set inside the recess 77 in the end cap major body 50, and further the spacer pieces 45, 46 are each made around outside surfaces thereof with some circular holes 47, 48, which have functions of lubricant reservoirs, alleviation of deformation or distortion caused in the molded spacer pieces, and ejector pinholes used to extract the molded spacer pieces out of the mold cavities. The end caps 4 as shown in FIG. 4 to 6 are each composed of the combined spacer pieces 45 and 46 having their outside surfaces 62, 68 to define radially inside curved surfaces 56, 58 of the turnaround passages 30, respectively, and the end cap major body 50 to make radially outside curved surfaces 55, 57 of the turnaround passages 30 and guide surfaces 59, 60 extending along widthwise opposite edges of the radially outside curved surfaces 55, 57 to make the sliding-contact with axially opposite ends 40 of the cylindrical roller 5. With the end cap 4 constructed as stated just earlier, the major and miner spacer pieces 45, 46 are combined with each other to fit one another in a way intersecting in a staggered relation with one another, and the combined spacer pieces 45, 46 is nested in the associated recess 77 in the end cap major body 50, thereby finishing the end cap 4.

Figure 7:
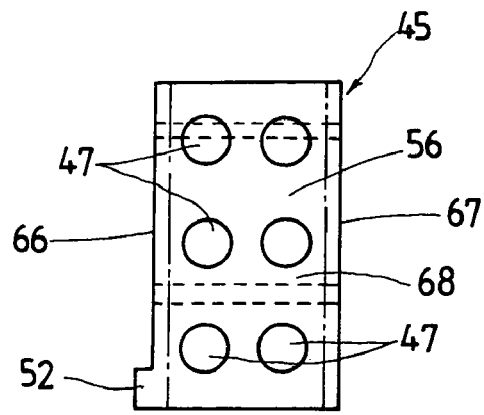
FIG. 7 is a view in front elevation showing a first spacer piece to be installed in end cap of the slider of FIG. 3.
Figure 8:
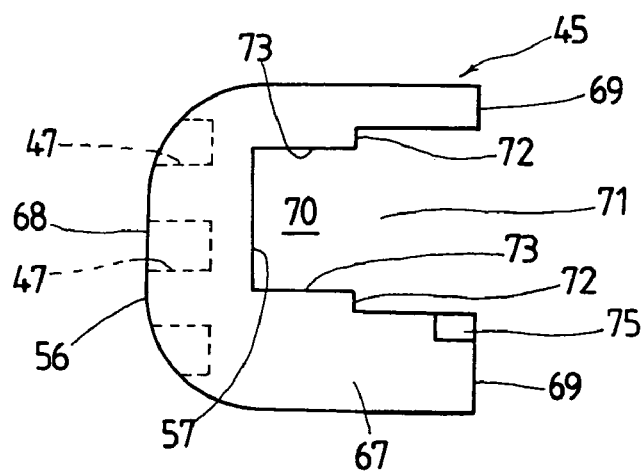
FIG. 8 is a view in side elevation showing the first spacer piece of FIG. 7.
Figure 9:
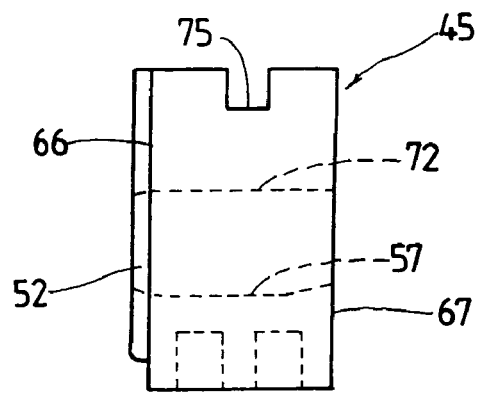
FIG. 9 is a view in plan of the first spacer piece of FIG. 7.
Figure 10:
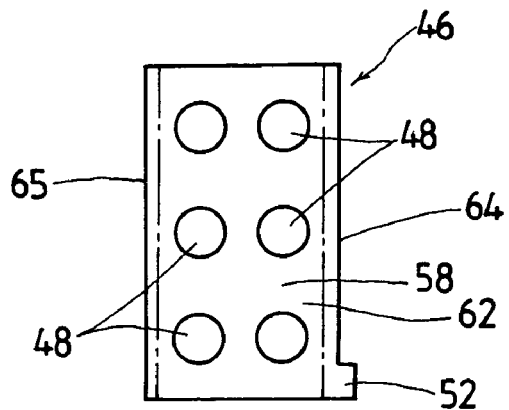
FIG. 10 is a view in front elevation showing a second spacer piece to be installed in end cap of the slider of FIG. 3.
Figure 11:
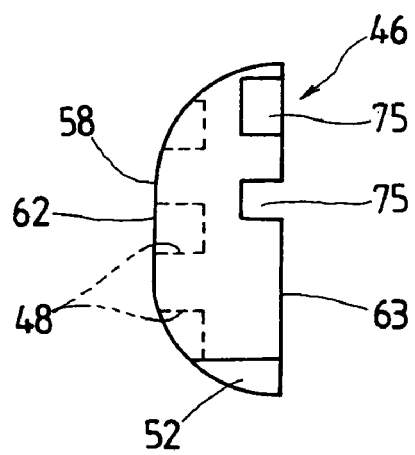
FIG. 11 is a view in side elevation showing the second spacer piece of FIG. 10.
Figure 12:
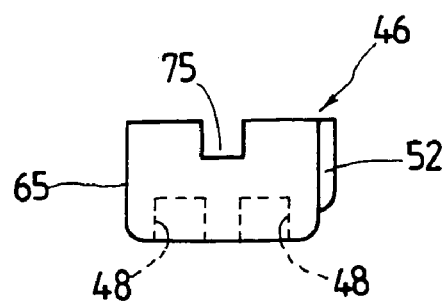
FIG. 12 is a view in plan of the second spacer piece of FIG. 10.

With the linear motion guide unit of the present invention, the turnaround passages 30A, 30B intersect in a staggered relation with one another in sidewise opposite portions 74 of the end cap 4 in a way the recirculating circuits detour from one another. More particularly, the turnaround passages 30A, 30B intersecting with one another in sidewise opposite portions 74 of the end cap 4 are made in a fashion that any one turnaround passage 30A as shown in FIGS. 7 to 9 is made deeper below inward surface 76 of the end cap major body 50 to be mated with the associated end of the carriage 3, while another turnaround passage 30 B as shown in FIGS. 10 to 12 is made less in depth below the inward surface 76 of the end cap major body 50, thereby detouring around the turnaround passage 30A. The turnaround passages 30A and 30B cut in the sidewise opposite portions 74 of any one of the forward and aft end caps 4 are made reversed in location over 180 degrees with respect to the turnaround passages 30A and 30B in another end caps 4. After the forward and aft end caps 4 have been placed on the lengthwise opposite ends 35 of the carriage 3, any one recirculating circuit is made looped at any one of the forward and aft end caps 4 with any one turnaround passage 30A defined by the major spacer piece 45 while any another end cap 4 with another turnaround passage 30B defined by the minor spacer piece 46. Thus, paired recirculating circuits intersecting with one another at their turnaround passages 30A, 30B are identical with one another in overall fore-and-aft length and made staggered with one another in lengthwise direction.

As shown in FIGS. 5 and 6, the turnaround passage 30A sinking deeper below the inward surface 76 of the end cap major body 50 is defined by the radially outside curved surface 55, the guide surfaces 59 extending along widthwise opposite edges of the radially outside curved surface 55 to bear the axially opposite ends 40 of the cylindrical roller 5 against them in a sliding-contact manner, and the radially inside curved surface 56 made on the outside surface 68 of the major spacer piece 45. Another turnaround passage 30B made less in depth below the inward surface 76 of the end cap major body 50 is constituted with the radially outside curved surface 57, the guide surfaces 60 extending along widthwise opposite edges of the radially outside curved surface 57 to bear the axially opposite ends 40 of the cylindrical roller 5 against them in a sliding-contact manner, and the radially inside curved surface 58 prepared on the outside surface 62 of the minor spacer piece 46, which fits into a recess 71 made in the major spacer piece 45.

The major spacer piece 45, as shown in FIG. 5, is recessed to fit over the minor spacer piece 46 across a width (S) somewhat larger than the transverse dimension (T) of the turnaround passage to prevent the minor spacer piece 46 from falling into the turnaround passage 30, helping make the turnaround passage 30 smooth with accuracy. That is, the recessed width in the major spacer piece 45 and the sidewise dimension of the minor spacer piece 46 are both made larger than the transverse dimension (T) of the turnaround passage. As seen in FIG. 6, a recessed width (S) to fit over the major spacer piece 45 is likewise made larger than the transverse dimension (T) of the turnaround passage. On the inward surface 76 of the end cap major body 50, there are made the oily paths 32 reaching from the recirculating circuits to the lubrication port 29 coupled with the grease nipple 43 and so on. The major spacer piece 45 and an inward surface of the minor spacer piece 46 are both made thereon with lubrication grooves 75 that communicate with the oily paths 32 cut in the end cap major body 50 and also open to the recirculating circuits. The end cap major body 50, as shown in FIGS. 5 and 6, is provided on the inward or rearward surface 75 thereof with spigots 31 extending out of the turnaround passages 30. The spigots 31 raised above the end cap major body 50 fit into their associated fore-and-aft holes 9 in the carriage 3, coming into mutual engagement with any counterparts or mating parts 23 of the tubular compositions 6 to set the tubular composition 6 in accurate place where the turnarounds 4 in the end cap 4 come into alignment with the return passages 10 in the tubular compositions 6 to finish the recirculating circuits to allow the rollers 5 rolling through there with smoothness.

Referring to FIGS. 7 to 12, there are shown both the major and minor spacer pieces 45, 46 to be nested within the end cap major body 50. The major and minor spacer pieces 45, 46 have outside curved surfaces 68, 62 around them to form the radially inside curved halves of the turnaround passages 30A, 30B, respectively. The outside curved surfaces 68, 62 are made therein with some holes 47, 48, whose numbers are six, respectively, in the illustrative embodiments of FIGS. 7 and 10. These holes 47, 48 are envisaged reserving or storing lubricant therein to keep the linear motion guide unit against lubrication failure. The major and minor spacer pieces 45, 46, usually molded synthetic resins using injection molding techniques, may be protected by the presence of the holes 47, 48 against any distortion or deformation that might otherwise occur in the course of molding procedure. Thus, the presence of the holes 47, 48 helps make sure of precise production of the major and minor spacer pieces 45, 46. The holes 47, 48 may also be used to push the molded spacer pieces from the mold by ejector pins or knockout pins, thereby helping extract steadily the molded spacer pieces out of the mold cavities without causing any dents or scratches on the outside curved surfaces 68, 62 around the major and minor spacer pieces 45, 46, making certain of the perfect spacer pieces 45, 46 with accuracy. These holes 47, 48 are further made in pinpoint size that is small enough to have less impact on rolling operation of rollers even they are very small or miniature in diameter. Moreover, the holes 47, 48 are made in circular contour, which would make the impact on the rolling motion of the rollers 5 even less, helping smooth rolling of the rollers 5. The major and minor spacer pieces 45, 46 are preferably made of molded product that is tougher to cause any burr. Moreover, all the holes 47, 48 are identical in direction and face directly the front to make it convenient to push the molded products of the spacer pieces 45, 46 from the mold by ejector pins or knockout pins in the course of producing the spacer pieces 45, 46, thereby helping extract the molded spacer pieces 45, 46 out of the mold cavities without causing any dents or scratches owing to the ejector pins. Besides, these holes 47, 48 as shown in FIGS. 7 and 10 are made six in number in a fashion that three spaced at a regular intervals in a row are made double to make it easier to extract steadily the molded products out of the mold cavities without causing any distortion. In addition, the holes 47, 48 are expected to serve to lessen any distortion or deformation of the molded products that might otherwise causes much in the course of molding procedure, making it easier to produce the major and minor spacer pieces 45, 46 with accuracy.

Of the turnaround passages 30A and 30B made crossed one another in the end cap 4 in a staggered relation, the turnaround passage 30A disposed deeper in the end cap 4 is defined with the major spacer piece 45 shown in detail in FIGS. 7 to 9. This major spacer piece 45 is made rectangular in contour when viewed in front elevation, whose outside curved surface 68 seen in the front will be to define the radially inside curved surface 56 of the turnaround passage 30A, widthwise opposite sides 66, 67 being prepared for mating surfaces coming into engagement with the end cap major body 50, and the rearward end 69 will be in flush relation with the inward surface 76 of the end cap major body 50. As the turnaround passage 30A is constituted with a longer straight race, a quarter rounded race, a shorter straight race, another quarter rounded race, and another longer straight race, which are sequenced as recited earlier, the outside curved surface 68 around the major spacer piece 45 to define the radially inside curved surface 56 of the turnaround passage 30A is correspondingly made to have a longer straight area, a quarter rounded area, a shorter crosswise straight area, another quarter rounded area, and another longer straight area. Moreover, the outside curved surface 68 of the major spacer piece 45 is made larger in widthwise dimension than the radially inside curved surface 56 in the turnaround passage 30A by the dimension of widthwise opposite shoulders made inside the end cap major body 50 so that the major spacer piece 45 is born against the shoulders 72 when having fit into the recess 77 in the end cap major body 50 as shown in FIG. 4. The major spacer piece 45 is also recessed at 71 below the rearward end 69 to accommodate the minor spacer piece 46 therein. The recess 71 in the major spacer piece 45 is enlarged partially in sidewise direction to form shoulders 72 to bear against there the minor spacer piece 46 that is nested within the major spacer piece 45, and more deeply sunken to make a deep recess 70 for the provision of the turnaround passage 30B in staggered relation with the turnaround passage 30A. Thus, the bottom of the deep recess 70 will provide the radially outside curved surface 57 of the turnaround passage 30B, where the rollers 5 come into rolling contact at their rolling surfaces 39 against there. Opposite sides 73 defining sidewise the deep recess 70 is to guide the rollers 5 in sliding manner on their axially opposite ends 40. The recess 71 is moreover enlarged in sidewise direction relatively to the deep recess 70 to form shoulders 72 at the boundary between them.

Of the turnaround passages 30A and 30B made crossed one another in the end cap 4 in a staggered relation, the turnaround passage 30B disposed less in depth in the end cap 4 is defined with the minor spacer piece 46 shown in detail in FIGS. 10 to 12. This minor spacer piece 46 is also made rectangular when viewed in front elevation, whose outside curved surface 62 seen in the front will be to define the radially inside curved surface 58 of the turnaround passage 30B, widthwise opposite sides 64, 65 being prepared for mating surfaces coming into engagement in part with the end cap major body 50 while in part with the major spacer piece 45, and the rearward end 63 will be in flush relation with the inward surface 76 of the end cap major body 50. In conformity to the radially inside curved surface 58 of the turnaround passage 30B, which is composed of a quarter rounded race, a shorter straight race and another quarter rounded race, the outside curved surface 62 around the minor spacer piece 46 to define the radially inside curved surface 58 of the turnaround passage 30B is correspondingly made to have a quarter rounded area, a crosswise straight area and another quarter rounded area. Of the paired recirculating circuit staggered one another at their turnaround passages 30A and 30B in the slider 2, any one recirculating circuit is made up of any one load-carrying race 34, any one set of upside and downside turnaround passages 30A, 30B made in the forward and aft end caps 4, one to each end cap, and any one return passage 10, while another recirculating circuit is made up of another load-carrying race 34, another set of upside and downside turnaround passages 30A, 30B made in the forward and aft end caps 4, one to each end cap, and another return passage 10. Thus, the paired recirculating circuits intersecting with one another in the end caps 4 are made staggered with one another in lengthwise direction to be identical with one another in overall fore-and-aft length in the slider 2. On the mating sides 64 to 67 of the major and miner spacer pieces 45 and 46, raised portions 52 of reference are made to determine whether the spacer pieces 45, 46 are headed in the right direction when they are assembled in the end cap major body 50. With the slider 2 constructed as stated earlier, every components including end cap major body 50, major spacer piece 45 and minor spacer piece 46 are allowed to come correctly into mutual combination to form the turnaround passages 30 in the end caps 4 by virtue of the raised portions 52 of reference.

Figure 2:
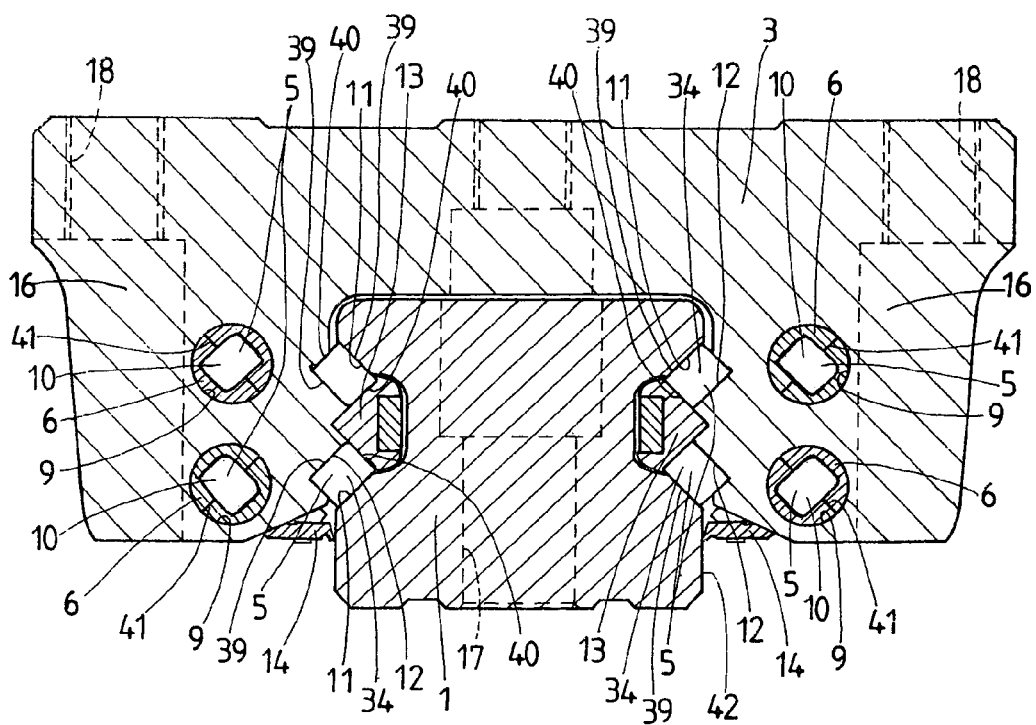
FIG. 2 is a view in transverse section along a plane I-I of FIG. 1 showing the linear motion guide unit.
Figure 13:
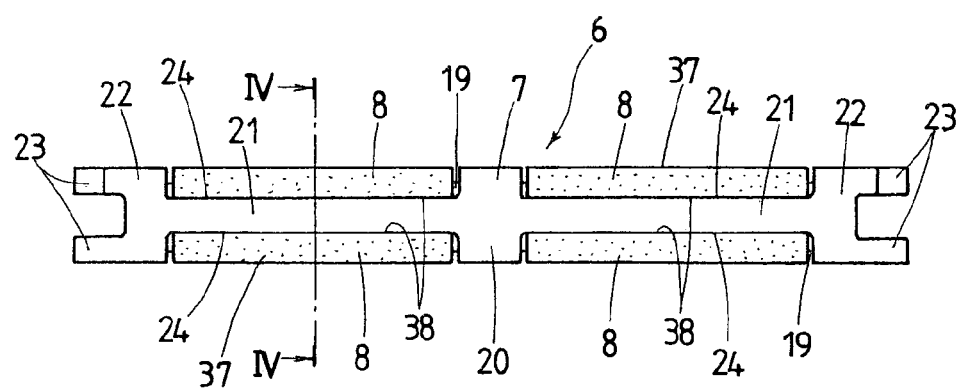
FIG. 13 is a view in front elevation showing a sleeve to be incorporated in the linear motion guide unit of FIG. 1.
Figure 14:
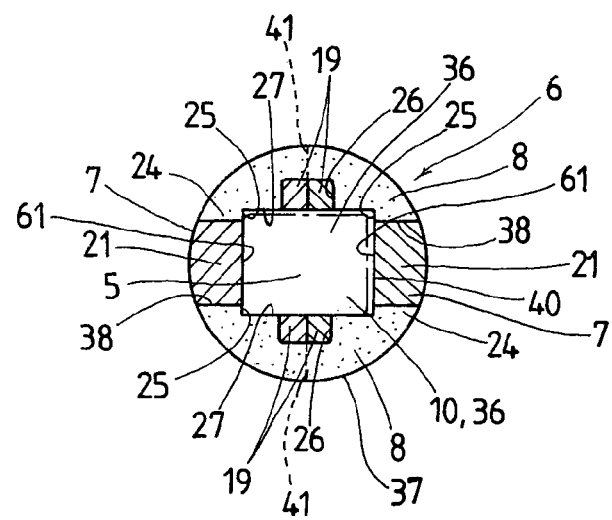
FIG. 14 is a view in transverse section of the sleeve taken on the plane of the line IV-IV of FIG. 13.

Referring next to FIGS. 13 and 14, there is shown a return passage 10 that marks the linear motion guide unit of the present invention. The return passage 10 is defined inside the central axial hole 36 in the tubular composition 6, which fits longitudinally into the fore-and-aft hole 9, as shown in FIG. 2, made in the carriage 3 of the slider 2. The tubular composition 6 is formed in a circular contour as a whole viewed in transverse section to have a cylindrical outside surface, while the central axial hole 36 is formed to have a rectangular configuration in transverse section, which is suited for the provision of the return passage 10. The central axial hole 36 rectangular in transverse section is made to have a dimension of just over an axial section of the cylindrical roller 5 to allow the rollers 5 rolling through there. The tubular composition 6 is comprised of the tubular skeleton 7 to make certain of mechanical stiffness or strength in the tubular composition for itself, and cellular members 8 impregnated with lubricant to ensure adequate lubrication onto the rollers 5. The tubular skeleton 7 is made up of two longitudinal halves to be joined together on their mating lengthwise surfaces 41 as shown in FIG. 2, and further provided therein with windows 24 made open to the central axial hole 36 or the return passage 10 from a circular outside surface. The cellular members 8 are each made of any molded or cast product of a desired shape to fit easily into the associated window 24. The cellular members 8 are ready for soaking up and retaining lubricant, followed by applying the lubricant onto the rollers 5, and exposed to the return passage 10 in such a way providing return races 27 that make rolling-contact with the rolling surface 39 of the roller 5 while other return races 25 that make the sliding-contact with axially opposite ends 40 of the cylindrical roller 5. The tubular skeleton 7 retains enough mechanical stiffness or strength to make sure of allowing the rollers 5 to roll through the recirculating circuit with steadiness and reliability for a prolonged working period. Many windows 24 are made in the tubular skeleton 7 in a fashion extending lengthwise of the tubular skeleton 7 while the cellular members 8 are applied on the tubular skeleton 7 from the circular outside to fit into the windows 24 to finish the composition that is ready for soaking up and retaining lubricant, followed by applying the lubricant onto the rollers 5. The rollers 5 are born at their axially opposite ends 40 against guide surfaces 61 made in the tubular composition 6, while allowed to come at their circular surfaces 39 into rolling contact with the return races 25, 27.

With the linear motion guide unit constructed as stated earlier, the return passage 10 of the central axial hole 36 rectangular in transverse section is made to have a dimension of just over the roller 5 to allow the rollers 5 rolling through there. On the other hand, the tubular composition 6 is designed at the outside diameter thereof to fit easier into the fore-and-aft bore 9 in the carriage 3, for example made to allow a clearance of a matter of 0.1 mm between the outside circular surface of the tubular composition 6 and the mating inside circular surface of the fore-and-aft bore 9. Thus, the tubular composition 6 is made to loose-fit into the fore-and-aft bore 9.

With the linear motion guide unit of the present invention, moreover, the cellular member 8 preparatory to fitting into the associated window 24 in the tubular skeleton 7 is impregnated with lubricant to fill cells or pores in the cellular member 8 with the lubricant. Then, the cellular member 8 impregnated with lubricant fits into the associated window 24 to provide the tubular composition 6. Thereafter, the tubular composition 6 is inserted into a fore-and-aft bore 9 in a slider 2 to finish the return passage 10 where the rollers 5 are steadily applied with lubricant while rolling through there to make sure of adequate lubrication to other rollers 5 that roll through a recirculating circuit, especially a load-carrying race 34. The tubular composition 6 constructed as stated earlier helps get the rollers 5 to roll through the recirculating circuits and also realizes the maintenance-free condition for lubricant supply to the recirculating circuit. In the slider 2 constructed as stated above, the end caps 4 are made on their rearward ends 76 with the spigots 31 extending out of the turnaround passages 30 into the corresponding return passages 10, while the tubular composition 6 is made at forward and aft ends thereof with mating counterparts 23 to make fit-engagement with their associated spigots 31 to couple the tubular composition 6 with the end caps 4, finishing the recirculating circuit of rectangular shape in transverse section with causing no irregularity or gap at the boundary between them.

With the embodiment discussed here, the tubular composition 6, although not fixed but laid loosely inside the fore-and-aft hole 9 in the carriage 3, gets fastened against the end caps 4 attached to the forward and aft ends of the carriage 3. Moreover, the end caps 4 are set in alignment with the carriage 3 and fastened to the carriage 3 by means of bolts 44, shown in FIG. 1, which are tightened through bolt holes 28 in the end caps 4 in a manner to keep the spigots 31 of the end caps 4 in mutual mating relation with their complementary counterparts 23 of the tubular skeleton 7. Thus, the tubular skeleton 7 is brought into the precise position relative to the end caps 4 for keeping the return passages 10 in perfect alignment with their turnaround passages 30. Getting the spigots 31 of the end caps 4 to mate with their complementary counterparts 23 of the tubular skeleton 7 makes sure of connection where the return passage 10 and the associated turnaround passages 30 are made flush with one another to finish the recirculating circuit of rectangular shape in transverse section with causing no gap at the connection between the return passage 10 and the turnaround passages 30. Coplanar connection with no gap between the turnaround passages 30 in the end caps 4 and the associated return passage 10 defined in the tubular composition 6 fit snugly in the fore-and-aft bore 9 in the carriage 3 makes certain of allowing the rollers 5 to transfer smoothly from the turnaround passages 30 to their associated return passage 10 and also from the return passage 10 to the turnaround passages 30 in a circulating manner.

The tubular skeleton 7 is composed of forward and aft ends 22 each made therein with the central axial hole 36 and the mating counterparts 23, an intermediate trunk 20 with the central axial hole 36 midway between the forward and aft ends 22, arms 21 lying opposing sidewise and extending lengthwise to reach from the intermediate trunk 20 to any one of the forward and aft ends 22 to define the windows 24 between them, and flexible ribs 19 extending lengthwise inside the windows 24. The intermediate trunk 20 is especially benefit to make certain of satisfactory stiffness or mechanical strength when the tubular skeleton 7 is large in longitudinal direction. In contrast, the tubular skeleton 7 short in lengthwise dimension, although not shown, would be enough ensured for stiffness even if there is no intermediate trunk 20 midway between the forward and aft ends 22. The flexible ribs 19 in the tubular skeleton 7 are disposed setback inwards in a way extending lengthwise between the intermediate trunk 20 and any one of the forward and aft ends 22 midway between the sidewise opposed arms 21 in circular direction to make fit-engagement with the cellular members 8 to make sure of bearing the cellular members 8 against them. With the tubular skeleton 7 of the sort there is provided no intermediate trunk, the flexible ribs 19 are disposed setback inwards in a way extending lengthwise between the forward and aft ends 22 midway between the sidewise opposed arms 21 in circular direction. The cellular members 8 are each made to have a circular outside surface 37 extending lengthwise thereof, and a circular inside surface where there are made mating edges 38 extending lengthwise in sidewise opposed fashion to one another to be mated with their associated arms 21 of the tubular skeleton 7, the return races 25 and 27 extending beside the mating edges 38, one to each edge, to provide partially the return passages 10, and radially opposite recesses 26 extending in a longitudinal direction near the mating edges 38 to fit over the associated flexible ribs 19 of the tubular skeleton 7. The cellular members 8 on their mating edges 38 do not have to make engagement with the arms 21 of the tubular skeleton 7 and can be placed to leave any clearance away from the arms 21. The arms 21 of the tubular skeleton 7, although but designed in the embodiment shown here to make abutment between the forward and aft ends 22 against the mating edges 38 of the cellular members 8, can be made to extend over the mating edges 38 to cover the sidewise opposite sides of the cellular members 8. In this alternative, just pushing the sidewise edges of the cellular members 8 into the associated windows 23 in the tubular skeleton 7 may be sufficient to hold the cellular members 8 on the tubular skeleton 7 and, therefore, the cellular members 8 has no mating edges to come into abutment against the arms of the tubular skeleton 7, but may make only line contact along their sidewise outside edges, not shown.

The cellular members 8 are installed from above and below into the windows 24, which are arranged on the top and the bottom between the arms 21 spaced away from one another in circular direction. The cellular members 8 also fit into the windows 24 in a way lying lengthwise on opposite sides of the intermediate trunk 20 of the tubular skeleton 7. Thus, the linear motion guide unit constructed as stated earlier, in all, has four pieces of cellular members 8 installed in the tubular skeleton 7. Moreover, the lengthwise recess 26 inside the cellular member 8 to fit over the flexible ribs 19 of the tubular skeleton 7 is flanked by the return races 25 and 27. Thus, the cellular member 8 is made of a molded product with a desired shape to fit snugly into the window 24 in the tubular skeleton 7. The cellular member 8 further has the circular outside surface and the inside surface where there are made the return races 25 and 27 to provide the return passage 10. Moreover, the cellular member 8 is made on the inside surface thereof with the recess 26 to fit over the flexible ribs 19 of the tubular skeleton 7. Four pieces of cellular member 8 in the embodiment discussed here are installed in the tubular skeleton 7 in a way separating away from one another. As an alternative, four cellular members 8 are not separated into distinct members, but may be made connected partially with one another. With the construction in which the cellular members 8 are joined in series with one another in the lengthwise direction through any connector, for example, the intermediate trunk 20 of the tubular skeleton 7 is cut partially to provide a slot to fit the connector therein. With another alternative in which the cellular members 8 are joined together in circular direction through any connector, the arms 21 of the tubular skeleton 7 is cut partially to a circular slot to fit the connector therein.

Of the return races 25 and 27 made on the cellular member 8, one return race 27 is to make rolling-contact with the rolling surface 39 of the roller 5 while the other race 25 is to make, albeit slightly, in part the sliding-contact with axially opposite ends 40 of the cylindrical roller 5. Thus, the cellular member 8 is set to come into contact at the return races 25 and 27 thereof with both the rolling surface 39 and the axially opposite ends 40 of the cylindrical roller 5. The cellular members 8 installed in the tubular skeleton 7 as stated earlier ensure the provision of the return passages 10 where the return races 25 and 27 are constantly kept in contact with the rolling surface 39 and the axially opposite ends 40 of the cylindrical roller 5, respectively, no matter whether the linear motion guide unit works in any posture. The cellular member 8 serves to absorb lubricant, which fills pores or cells to be held in the cellular texture and later applied to the rollers 5. To this end, the cellular members 8 ahead of their assembly with the tubular skeleton 7 are impregnated with the lubricant and later joined together with the tubular skeleton 7. With the embodiment constructed as stated earlier, the cellular members 8 are previously impregnated with the lubricant preparatory to fitting into the tubular skeleton 7. Even after the lubricant has run out during operation of the linear motion guide unit, just supply of lubricant through the grease nipple 43 or the lubrication port 29 is sufficient. In some cases, excess lubricant would be absorbed into the cellular members 8 with the aid of the rollers 5. Besides, the desired lubricant may be selected from various lubricants depending on the requisites for operational conditions.

Moreover, the tubular skeleton 7 is made of synthetic resin while the cellular member 8 is made of sintered resinous material. The tubular skeleton 7 is needed to allow the rollers 5 running through the return passages 10 with smoothness for long-lasting circulating movement. To cope with this, the tubular skeleton 7 is made of any material that is high in stiffness and no or less in wear, which might otherwise occur resulting from any pressing action exerted by the rolling surfaces 39 of the rollers 5, any sliding engagement with the axially opposite ends 40 of the rollers 5, and any wedge action due to the circular edges of the rollers 5. The tubular skeleton 7 is made of, for example any one of synthetic resins, and metals including aluminum, and so on. In the embodiment discussed now, the tubular skeleton 7 was produced of synthetic resins including polyacetal, and so on, which is better in stiffness, wear proof, lubrication and affinity. Any material would be selected for the cellular members 8 as long as the material is suited for the provision of cellular texture that could allow absorption, retention and delivery of lubricant, even with wear proof property. In the embodiment recited here, the cellular member 8 was made of sintered resinous material, for example a sintered compact product of a powder of ultrahigh molecular weight polyethylene, which is easier to handle, high in mechanical stiffness, well in shape preservation and anti-clogging property for long-lasting service life, and better in absorption, retention and delivery of lubricant.

What is claimed is:

1. A linear motion guide unit comprising an elongated guide rail having a lengthwise raceway surface thereon, and a slider movable lengthwise of the elongated guide rail, the slider being comprised of a carriage made therein with a second raceway surface in opposition to the first raceway surface and a return passage extending in parallel with a load race defined between the first and second raceway surfaces, end caps mounted on lengthwise opposite ends of the carriage and made therein with turnaround passages connecting the load race with the associated return passage, and more than one roller allowed to roll through a recirculating circuit composed of the load race, the return passage and the turnaround passage, wherein the end caps are each comprised of an end cap major body to make a radially outside curved surface of the turnaround passage and guide surfaces extending along widthwise opposite edges of the radially outside curved surface to make a sliding-contact with axially opposite ends of the roller, and a spacer having an outside surface to make a radially inside curved surface of the turnaround passage after having fitted into the end cap major body, the outside surface of the spacer having thereon some holes, which have functions of lubricant reservoirs, prevention of distortion caused in the molded spacer pieces, and ejector pinholes, and wherein the holes in the spacer are made circular in shape and indentical in their heading directions to be opposite against rolling surfaces of the rollers while they roll through the turnaround passage.

2. A linear motion guide unit constructed as defined in claim 1, wherein there is six in all of the holes made around the outside surface of the spacer which are located in two rows, wherein each of the two rows has three of the holes which are spaced from each other at a regular interval.

3. A linear motion guide unit constructed as defined in claim 1, wherein a raised portion of reference is made on a mating side of the spacer to determine whether the spacer is oriented in a right direction when the spacer is assembled in the end cap major body.

4. A linear motion guide unit constructed as defined in claim 1, wherein the return passage is provided by a hole rectangular in transverse section defined inside a tubular composition that fits into a hole made in the carriage, and the tubular composition is composed of a tubular skeleton having therein a lengthwise window made open from a circular surface thereof to the hole, and a molded member extending lengthwise to fit into the window in the tubular skeleton to provide a return race for the return passage, the molded member being made of a cellular material adapted to be impregnated with lubricant.

5. A linear motion guide unit constructed as defined in claim 4, wherein the tubular skeleton is made of synthetic resin while the cellular material is made of a sintered resinous material.

6. A linear motion guide unit constructed as defined in claim 1, wherein the end caps are each made therein with the turnaround passages arranged in a staggered relation with one another to make a pair of the recirculating circuits in the slider in a fashion that they are arranged in a staggered relation with each other, and wherein the turnaround passages staggered with one another are provided by the spacer accommodated in a recess made in the end cap major body, the spacer being constituted with a combination of a first spacer piece and a second spacer piece, the first spacer piece being fitted into the recess in the end cap major body to define any one of the turnaround passages, which is made more deeply than another turnaround passage in the end cap, and the second spacer piece being nested in a recess made in the first spacer piece to define the another turnaround passage, which is made less in depth than the one turnaround passage.

7. A linear motion guide unit constructed as defined in claim 6, wherein the first spacer piece is provide din a recess therein with a shoulder against which the second spacer piece is born having received inside the recess.

8. A linear motion guide unit constructed as defined in claim 6, wherein the first and second spacer pieces are made on their rearward surfaces with lubricant grooves that communicate with lubricant paths cut in the end cap major body which paths reach associated recirculating circuits.

* * * * *